United States Patent Office 3,161,603
Patented Dec. 15, 1964

3,161,603
RECOVERY OF COPPER-VANADIUM CATALYST
David Morgan Leyshon and John Stewart, Manchester, England, assignors to Imperial Chemical Industries Limited, London, England, a corporation of Great Britain
No Drawing. Filed Dec. 18, 1961, Ser. No. 160,334
Claims priority, application Great Britain, Jan. 23, 1961, 2,578/61
4 Claims. (Cl. 252—413)

This invention relates to a process for recovering the copper-vanadium catalyst from the waste liquors obtained in the manufacture of adipic acid by the nitric acid oxidation of cyclohexanol and/or cyclohexanone and is a modification of the processes described in U.K. patent specification No. 756,679. In connection with the present invention the term copper-vanadium catalyst includes any compounds of copper and vanadium which may be formed in the various processes referred to.

According to U.K. Patent No. 572,260 in the manufacture of adipic acid by the nitric acid oxidation of cyclohexanol, cyclohexanone or of mixtures containing them obtained by the oxidation of cyclohexane, the nitric acid oxidation is carried out in the presence of both vanadium and copper, either as such or in the form of their oxides or salts, the amount of copper used being between 1 part and 40 parts by weight per part by weight of the vanadium used. The waste liquors obtained in the above process after isolation of the adipic acid by filtration, contains valuable amounts of catalyst salts and by-product organic acids such as glutaric and succinic acids. According to U.K. Patent No. 756,679 the copper-vanadium catalyst and by-products from the abovementioned waste liquors are recovered by adding to the waste liquors sulphuric or phosphoric acid in an amount slightly more than equivalent to the nitrate salts present, evaporating the liquors until substantially all water and nitric acid has been removed and isolating the catalyst and by-products from the residue.

According to the present invention we provide a process for recovering the copper-vanadium catalyst from the waste liquors obtained in the manufacture of adipic acid by the nitric acid oxidation of cyclohexanol and/or cyclohexanone or mixtures containing them which comprises the steps of adding sulphuric or phosphoric acid to the waste liquor in an amount slightly more than equivalent to the nitrate salts present evaporating nitric acid and water therefrom, filtering the molten residue to separate the insoluble catalyst, redissolving the catalyst in water or dilute nitric acid, reprecipitating the catalsyt at a pH above 7 and washing the precipitated catalyst with water.

Evaporation of nitric acid and water by heating is preferably performed under reduced pressure. The evaporation may be performed rapidly at temperatures up to about 150° C. provided vigorous reaction and decomposition is prevented, by blowing steam conveniently at a temperature of from 100° C. to 170° C. into the liquors or by continuous addition thereto of fresh or partially concentrated waste liquors, preferably at a temperature of from 40° C. to 90° C. The rate of addition of steam or fresh waste liquors is adjusted so as to prevent undue rise in temperature, or the formation of nitrous gases above about 95° C. It may also be convenient to blow air through the hot molten residue in order to remove any remaining small amount of nitric acid. Owing to the presence of added mineral acid the whole of the nitric acid, both free and that originally combined as salt may be readily removed.

After the precipitated catalyst has been purified in the above manner it may be redissolved in nitric acid and returned for use in the oxidation of cyclohexanol and cyclohexanone.

We have found that by the purification process of our invention recovered catalyst of excellent quality is obtained, which contains a lower proportion of organic impurities than catalyst recovered by previously known methods.

In operating the process of the invention it is found convenient to reprecipitate the catalyst at a pH above 7 and preferably between 8 and 9 by the use of alkalis such as the alkali metal and alkaline earth metal hydroxides and carbonates, but we prefer to use alkali metal hydroxides such as sodium hydroxide.

The invention is illustrated but not limited by the following example in which parts and percentages are by weight.

Example 80 parts of the crude catalyst obtained according to the process of Example 3 of U.K. patent specification No. 756,679 are dissolved in 320 parts of 5% aqueous nitric acid. The dissolved catalyst is agitated and sufficient 40% aqueous sodium hydroxide is added to bring the pH to 8–9, about 40 parts of 40% aqueous sodium hydroxide being required to bring the pH to this level and to precipitate the catalyst quantitatively. The temperature is held at 90–95° C. for 1 hour, the precipitated catalyst filtered off and washed on the filter with four lots of 20 parts each of water. The catalyst is then substantially free from organic matter and is suitable when dissolved in nitric acid for direct re-use in the oxidation to adipic acid of cyclohexanol, cyclohexanone or the product of air oxidised cyclohexane.

If desired the crude catalyst may be initially dissolved in water instead of 5% nitric acid.

What we claim is:

1. A process for the recovery of copper-vanadium catalyst from the waste liquor obtained in the manufacture of adipic acid by nitric acid oxidation of a member of the group consisting of cyclohexanol, cyclohexanone, and mixtures thereof and containing nitrate salts as a result of said oxidation, said process comprising the steps of adding to the waste liquor an acid selected from the group consisting of sulphuric acid and phosphoric acid in an amount slightly more than the chemical equivalent of the nitrate salts present in the waste liquor, evaporating substantially all of the water and nitric acid from said waste liquor by the application of heat thereto, filtering the molten residue to separate the insoluble catalyst, redissolving the catalyst in a member of the group consisting of water and dilute nitric acid, reprecipitating the catalyst by adding alkali thereto to raise the pH to above 7 and washing the precipitated catalyst with water.

2. A process according to claim 1 wherein after washing with water the precipitated catalyst is redissolved in nitric acid.

3. A process according to claim 1 wherein the reprecipitating step is conducted at a pH of from 8 to 9.

4. A process according to claim 1 wherein the alkali is an alkali selected from the group consisting of alkali metal hydroxides, alkali metal carbonates, alkaline earth metal hydroxides and alkaline earth metal carbonates.

References Cited by the Examiner
UNITED STATES PATENTS 2,381,659   8/45   Frey _____ 252—413
2,791,566   5/57   Jeffers _____ 252—413

MAURICE A. BRINDISI, Primary Examiner.